(12) United States Patent
Chomal

(10) Patent No.: US 8,862,402 B2
(45) Date of Patent: Oct. 14, 2014

(54) SYSTEMS AND METHODS WITH ROUTE CHARTS FOR TRAFFIC CONTROL SYSTEMS

(71) Applicant: General Electric Company, Schenectady, NY (US)

(72) Inventor: Sangeeta Atmaram Chomal, Bangalore (IN)

(73) Assignee: General Electric Company, Schenectady, NY (US)

( * ) Notice: Subject to any disclaimer, the term of this patent is extended or adjusted under 35 U.S.C. 154(b) by 56 days.

(21) Appl. No.: 13/671,613

(22) Filed: Nov. 8, 2012

(65) Prior Publication Data

US 2014/0129138 A1 May 8, 2014

(51) Int. Cl.
*G01C 21/00* (2006.01)
*B61L 17/00* (2006.01)

(52) U.S. Cl.
CPC ........................... *B61L 17/00* (2013.01)
USPC ............................ 701/533; 701/400; 701/537

(58) Field of Classification Search
CPC ........................................................ B61L 17/00
USPC .............................. 701/533, 400, 537
See application file for complete search history.

(56) References Cited

U.S. PATENT DOCUMENTS

| 3,865,042 | A * | 2/1975 | DePaola et al. ............... 104/26.1 |
| 6,418,854 | B1 * | 7/2002 | Kraft ............................ 104/26.1 |
| 7,596,433 | B2 * | 9/2009 | Muinonen et al. .............. 701/19 |
| 7,657,348 | B2 * | 2/2010 | Muinonen et al. .............. 701/19 |
| 7,747,362 | B2 * | 6/2010 | Muinonen et al. .............. 701/19 |
| 7,751,952 | B2 * | 7/2010 | Muinonen et al. .............. 701/19 |
| 7,792,616 | B2 * | 9/2010 | Muinonen et al. .............. 701/19 |
| 8,019,497 | B2 * | 9/2011 | Muinonen et al. .............. 701/19 |
| 8,032,078 | B1 * | 10/2011 | Donich et al. ..................... 455/8 |
| 8,302,535 | B2 * | 11/2012 | Chase ......................... 104/26.1 |
| 2002/0096081 | A1 * | 7/2002 | Kraft ............................ 104/26.1 |
| 2004/0030467 | A1 * | 2/2004 | Oguma et al. .................. 701/19 |
| 2004/0111309 | A1 * | 6/2004 | Matheson et al. ................ 705/8 |
| 2005/0228552 | A1 * | 10/2005 | Kornick et al. ................. 701/19 |
| 2009/0212168 | A1 * | 8/2009 | Kumar ..................... 246/167 R |
| 2012/0325980 | A1 * | 12/2012 | Noffsinger et al. ....... 246/169 R |

* cited by examiner

*Primary Examiner* — Mary Cheung
*Assistant Examiner* — Frederick Brushaber
(74) *Attorney, Agent, or Firm* — GE Global Patent Operation; John A. Kramer

(57) ABSTRACT

Systems and methods of the invention relate to including switch settings for various routes within a route chart for a vehicle. Embodiments of the invention include collecting route information between locations and switch information for each route via a data aggregation component. A map route component is configured to configure a setting for each switch associated with a route to allow a path of navigation from a first selected location to a second selected location. Additionally, the map route component is configured to include two or more switch settings into an indicia for each route of a route chart.

19 Claims, 4 Drawing Sheets

SYSTEMS AND METHODS WITH ROUTE CHARTS FOR TRAFFIC CONTROL SYSTEMS

BACKGROUND

1. Technical Field

Embodiments of the subject matter disclosed herein relate to traffic control systems for vehicles. Other embodiments relate to representing a configuration for a set of switches to enable a path of navigation for a vehicle between a first location and a second location.

2. Discussion of Art

Route navigation for vehicles can include a number of variables in relation to a start location and an end position, a number of routes available there between, as well as switch positions to enable a path of navigation for such routes. Switch devices can have numerous settings or configurations to activate or deactivate a particular route or path for a vehicle. With the amount of devices and communications increasing in light of technological advances, the amount of information for route selection and switch configuration has also increased, which tends to strain data management resources.

It may be desirable to have a system and method for vehicle route selection that differ from those that are currently available.

BRIEF DESCRIPTION

In an embodiment, a method includes evaluating a vehicle route chart to identify a set of switches that are operable to activate a path of navigation for a selected route between a first location and a second location, wherein the switches include respective settings to enable the path of navigation. A data structure is created that includes a first data packet representative of the selected route and a second data packet representative of the respective settings for the switches. The method further comprises controlling the settings for the set of switches for the selected route based at least in part on the data structure from the vehicle route chart. For example, the data structure is used to implement the settings for the set of switches for the selected route from the vehicle route chart.

In an embodiment, a system is provided that includes a vehicle route chart that includes a plurality of routes between a plurality of locations, and each route respectively includes a set of switches with respective settings that enable a path of navigation between a first location and a second location of the plurality of locations. The system can further include a data aggregation component that is configured to create a data structure for a selected route of the plurality of routes from the vehicle route chart, wherein the data structure includes a data packet with settings for the set of switches of the selected route. The system can further include a map route component that is configured to employ a portion of the data structure to adjust the settings of the set of switches of the selected route from the vehicle route chart.

In an embodiment, a system is provided that includes means for evaluating a vehicle route chart to identify a set of switches used with a route that activate a path of navigation for the route between a first location and a second location, wherein each switch of the set of switches includes a respective setting to enable the path of navigation. The system can include means for creating a data structure that includes a first data packet representative of the route and a second data packet representative of the respective setting for each switch of the set of switches used with the route. The system further can include means for communicating the data structure to implement the respective setting for each switch of the set of switches for the route from the vehicle route chart.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Embodiments of the invention relate to a method and system for including switch settings for various routes within a route chart for a vehicle. A data aggregation component can be configured to collect route information between locations and switch information for each route. A map route component configures a setting for each switch associated with a route to allow a path of navigation for a vehicle from a first selected location to a second selected location. Additionally, the map route component is configured to include two or more switch settings into indicia for each route of a route chart.

The term "vehicle" as used herein can be defined as an asset that is mobile. A suitable mobile machine may be transportable, or may transport at least itself, a person, and/or cargo. For instance, a vehicle can be, but is not limited to being, a locomotive or other rail vehicle (or group of rail vehicles), an intermodal container, a marine vessel, mining equipment, industrial equipment, construction equipment, and the like. "Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. "Computer" or "processing element" or "computer device" as used herein includes, but is not limited to, any programmed or programmable electronic device that can store, retrieve, and process data. "Non-transitory computer-readable media" include, but are not limited to, a CD- ROM, a removable flash memory card, a hard disk drive, a magnetic tape, and a floppy disk. "Computer memory", as used herein, refers to a storage device configured to store digital data or information which can be retrieved by a computer or processing element. "Controller", as used herein, refers to the logic circuitry and/or processing elements and associated software or program involved in controlling an energy storage system. The terms "signal", "data", and "information" may be used interchangeably herein and may refer to digital or analog forms. Switches include physical machine devices (such as point switch machines or crossing gates) that operatively open, block or move structures to define a portion of a path, and further include visual or other indicators that provide navigational clues (such as stop lights, radio navigational instructions, or directional arrows), so as to urge traveling vehicles to take a particular path out of a plurality of possible paths at a location.

Figure 1:
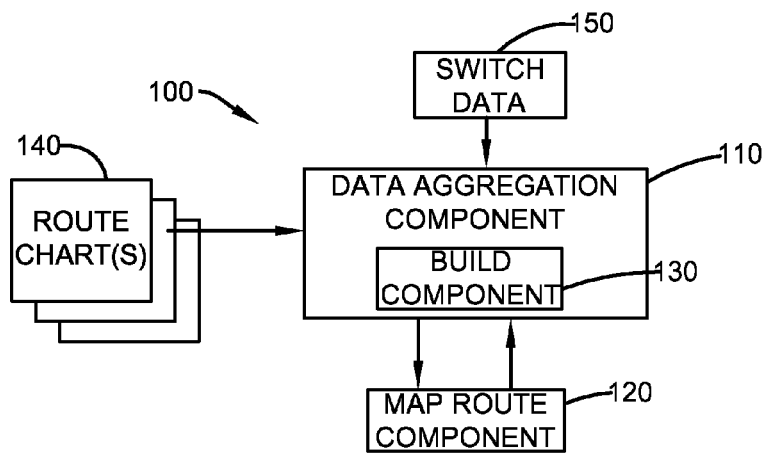
FIG. 1 is an illustration of an embodiment of a system for creating an indicia representative of a set of switch settings for a route for a path of navigation from a first location to a second location.

FIG. 1 is an illustration of a system 100 for creating an indicia representative of a set of switch settings for a route for a path of navigation from a first location to a second location. The system includes a data aggregation component 110 that is configured to collect at least one of a route chart 140 or a portion of switch data 150. The route chart includes data related to at least one route from various locations, wherein a route is a path of navigation from one location to another location. For instance, a route chart can include multiple location points with multiple routes for each start location and end location selected from such multiple location points. The portion of switch data is information related to one or more settings for two or more switches used to activate a route from a location to another location. By way of example and not limitation, the route chart and/or the portion of switch data can be pre-defined, aggregated from a remote source, collected from a local source, manually inputted, gathered from a data source (e.g., website, database, hard drive, among others), and the like. For instance, a start location (A) can include a route (R) to end point location (B), in which the route (R) can include two or more switches with each switch including a respective setting or value to activate or enable the route (R) from A to B.

The system further includes a build component 130 that is configured to construct an indicia 320 representative of a group of settings for the set of switches for a particular route between a start location and an end location. The build component can be a stand-alone component, incorporated into the data aggregation component (as illustrated), or a suitable combination thereof. The build component can create an indicia 320 that can be, but is not limited to, a data structure 330, an electronic indicia, a bit representation, a bit position within a control word, and the like. By way of example and not limitation, the build component can generate an indicia that is representative of configurations for each switch included with a route from one location to another location to activate or enable a path of navigation (e.g., the route) there between. In an embodiment, the setting or configuration for each switch can be a direction (e.g., a left direction, a right direction, a straight direction), a binary setting (e.g., 1, 0, on, off, among others), closed setting, open setting, or a combination thereof. The build component can independently create the indicia without affecting the route chart. For example, the route chart can be used to select and generate a particular route. The system allows the route chart to be further used by providing a setting (e.g., configuration) for each switch used for a particular route (e.g., a selected route in which the selection is made by using the route chart). The build component generates indicia that can be used to configure switches for one or more routes and independently incorporates such indicia (e.g., indicia for each route for each pair of locations) into a route chart in a manner that is isolated from the selection of routes. Such isolation can be, for example, graphically spaced on a display screen. For multi-dimensional displays, the isolation can be proximal or distal depending on the situation. Further examples may include tabs, transparency, carryover to a separate but coupled display device, and the like. In other instances, isolation can be structural insofar as it involves data organization and transmission over a communication path. Interleaving and multiplexing may be used in some applications, but more isolative techniques, such as concatenation or data packaging, may be used in other applications.

By way of example and not limitation, the indicia can be a data structure that includes a first data packet 340 representative of the route and a second data packet 350 representative of a setting for each of the set of switches used with the route. Such packet separation provides a sandboxed approach in which information of route selection/generation and switch setting information are independent and isolated from one another. The data packets (e.g., first data packet 340 and/or second data packet 250) can be incorporated into a signal 360 communicated to the set of switches. In an embodiment, the signal can be a function of the data packets.

A map route component 120 can use indicia to implement each setting for a set of switches for a selected route. The map route component can employ each setting for a set of switches based on the indicia created by the build component and/or the data aggregation component. Map route component can identify a selected route (e.g., a start location, an end location, a route, and the like) in which the indicia corresponding to such selected route can be used to ensure adjustment and configuration of each switch for the selected route to activate a particular path of navigation. By way of example and not limitation, indicia can be communicated from the system level to a navigation sub-system, to a communication sub-system that allows for control of the switches, and therethrough to the physical switches, among others. The indicia can be used to control a setting for each of the set of switches to enable a path of navigation for the selected route. Rather than communicating information for each of the set of switches, the indicia representative of the set of switches is communicated, resulting in reduce data communications, computations, among others.

Figure 2:
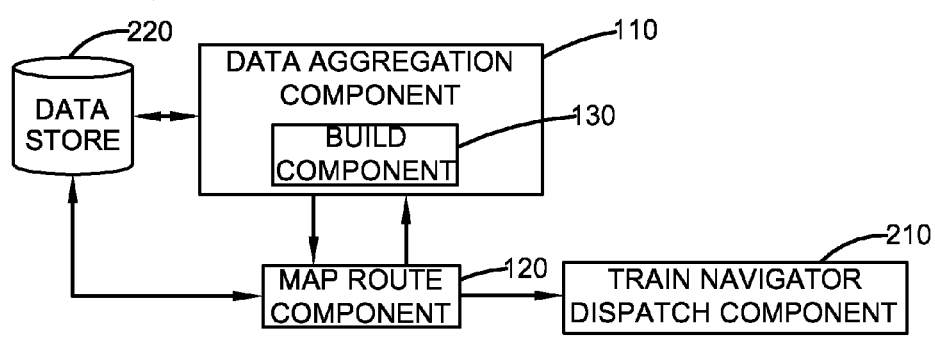
FIG. 2 is an illustration of an embodiment of a system for using navigation software to select a route and activate such route with setting for a set of switches associated with such selected route.

FIG. 2 is an illustration of a system 200 for using navigation software to select a route and activate such route with settings for a set of switches associated with such selected route. The system includes the data aggregation component 110 that is configured to gather at least one of one or more route charts for a vehicle and a portion of switch data. The route chart can include a plurality of routes that enable a path of navigation from one location to a second location. The portion of switch data can include a setting (e.g., a configuration) for each switch to enable the path of navigation for the vehicle to be available. Build component (e.g., depicted as a stand-alone component) can create an indicia, such as a data structure, that is representative of two or more switch settings for a particular route selected from the route chart. By way of example and not limitation, the data structure can include a first data packet representative of a route between two locations and a second data packet representative of settings for each switch of a set of switches used to enable the route between said two locations.

The system further includes a vehicle dispatch component 210 that is configured to manage traffic control for a rail vehicle or other vehicle (e.g., for a rail freight company, a transit company, and the like). The vehicle dispatch component can dispatch instructions to provide route information for a vehicle (e.g., to a user controlling such vehicle) as well as any device or component used when the vehicle travels from one location to another (e.g., switches, automatic control modules, computer, software, hardware, and the like), including control of transmission of commands to control such devices or components. The vehicle dispatch component can support dispatching for a centralized traffic control (CTC) territory or region, a non-CTC territory or region (e.g., a track warrant control territory or region, among others), and the like. By way of example and not limitation, the vehicle dispatch component can interact with appropriately configured rail wayside signaling devices (e.g., wayside equipment with remote communication capability) to communicate with vehicles and/or devices (e.g., switches, interlockings, other wayside equipment, among others), wherein the created indicia (e.g., data structure) can be used by the wayside signaling devices to configure each switch rather than implementing each switch setting based on information specific thereto (e.g., an individual transmission for a single switch along a route). By use of the indicia, programming, calculations, and communications bandwidth usage can be reduced. One example of suitable rail wayside signaling devices that can be used as part of the systems and methods described herein are ELECTROLOGIX devices. ELECTROLOGIX is a trademark for rail wayside signaling devices commercially available from GE Transportation (Erie, Pa.).

In an embodiment, the map route component 120 stores information related to the system with a data store 220. In another embodiment, the data aggregation component 110 collects data from the data store. The data store can include information such as, but not limited to, one or more route charts, a route for a first location and a second location, available locations to select from (e.g., a set of locations that can be selected as start locations and end locations), a setting for a switch (and/or plural respective settings for plural switches), switch association(s) for a route, type of switch, available settings for a switch, route selection historical data, switch setting historical data, user information for route selection, among others, and/or a suitable combination thereof.

The data store can include, for example, either volatile memory or nonvolatile memory, or can include both volatile and nonvolatile memory. By way of illustration, and not limitation, nonvolatile memory can include read only memory (ROM). The data store of the subject systems and methods is intended to comprise, without being limited to, these and other suitable types of memory. The data store can be a server, a database, a hard drive, a flash drive, an external hard drive, a portable hard drive, a cloud-based storage, and/or the like.

The indicia representative of respective one or more settings for each switch in a set of switches for a route can be a data structure. The route chart can be built into a look up table as a data/configuration file. The format of the data/configuration file of the route chart can be, but is not limited to being, as follows: E (endpoints of a route); N (control bits—normal route); A (control bits—auxiliary route); I (indication bits—normal route); Z (indication bits—auxiliary route; L (indication bits—locked, normal 1, reverse 1, normal 2, reverse 2); C (cancel control bits); X (cancel indication bits); and/or W (arrow indication). The above is an example that illustrates data included within file of the route chart and is not to be limiting on the subject innovation. For instance, the data/configuration file can include at least one of E (e.g., endpoints of a route) or N (control bits for a normal route). The data/configuration file can be parsed by software code of the vehicle dispatch component and stored as data structures and into, for instance, a data map (e.g., a route chart). A user can select a start location and an end location during route creation (e.g., use of the route chart), and the data map can be used to identify a selected route (e.g., based on the selected start location and the selected end location). Upon identification within the data map, parsing can identify route control bits or other indicia which were used to set/reset (e.g., setting, configuration, among others) wayside equipment depending on a condition established (e.g., condition establishing the particular route selected to achieve the desired route selected).

Figure 3:
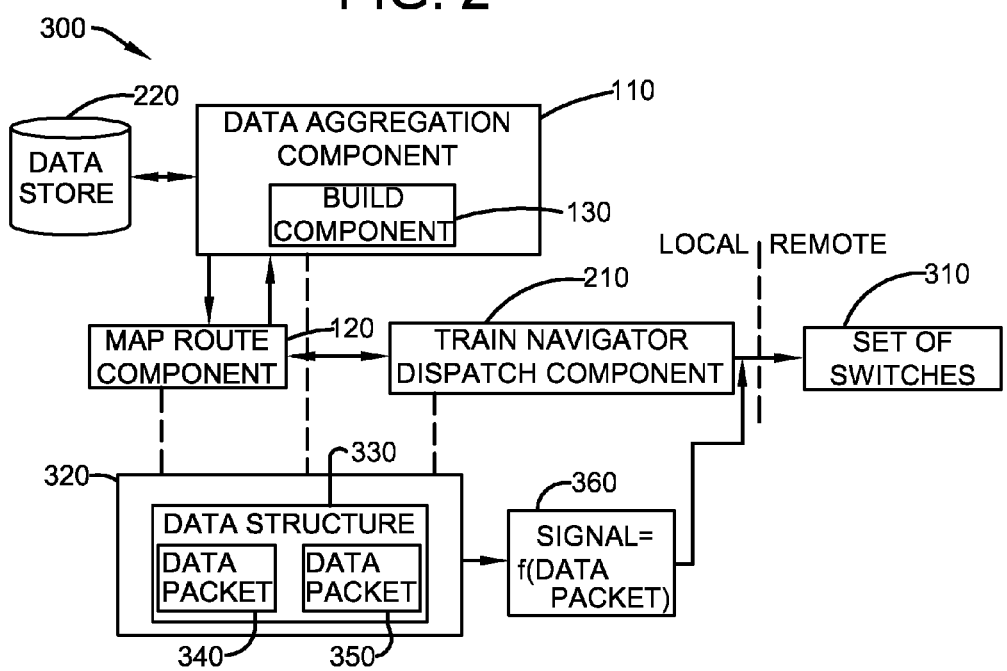
FIG. 3 is an illustration of an embodiment of a system for communicating a signal to a remote set of switches based on a created indicia representative of a setting for the set of switches to enable a route.

FIG. 3 is an illustration of a system 300 for communicating a signal to a remote set of switches based on a created indicia representative of plural settings for the set of switches to enable a route. The system 300 includes an aggregation component that can collect data (e.g., a route chart, a switch setting, a switch location, a switch association with a route, among others) from the data store 220 to create an indicia (via the build component 130) representative of two or more switch settings for a selected route of a vehicle. The map route component 120 can allow a selection of a route and/or generation of a route, wherein such selection and/or generation can implement particular indicia for such route. At least one of the map route component or the vehicle dispatch component can utilize the indicia (e.g., control word with defined bits, data structure, among others) to physically configure a set of switches 310 for the vehicle to activate a path of navigation corresponding to the selected route. For instance, the indicia can be communicated locally, remotely, or a combination thereof to a suitable device, component, software, or hardware that controls the set of switches.

Figure 4:
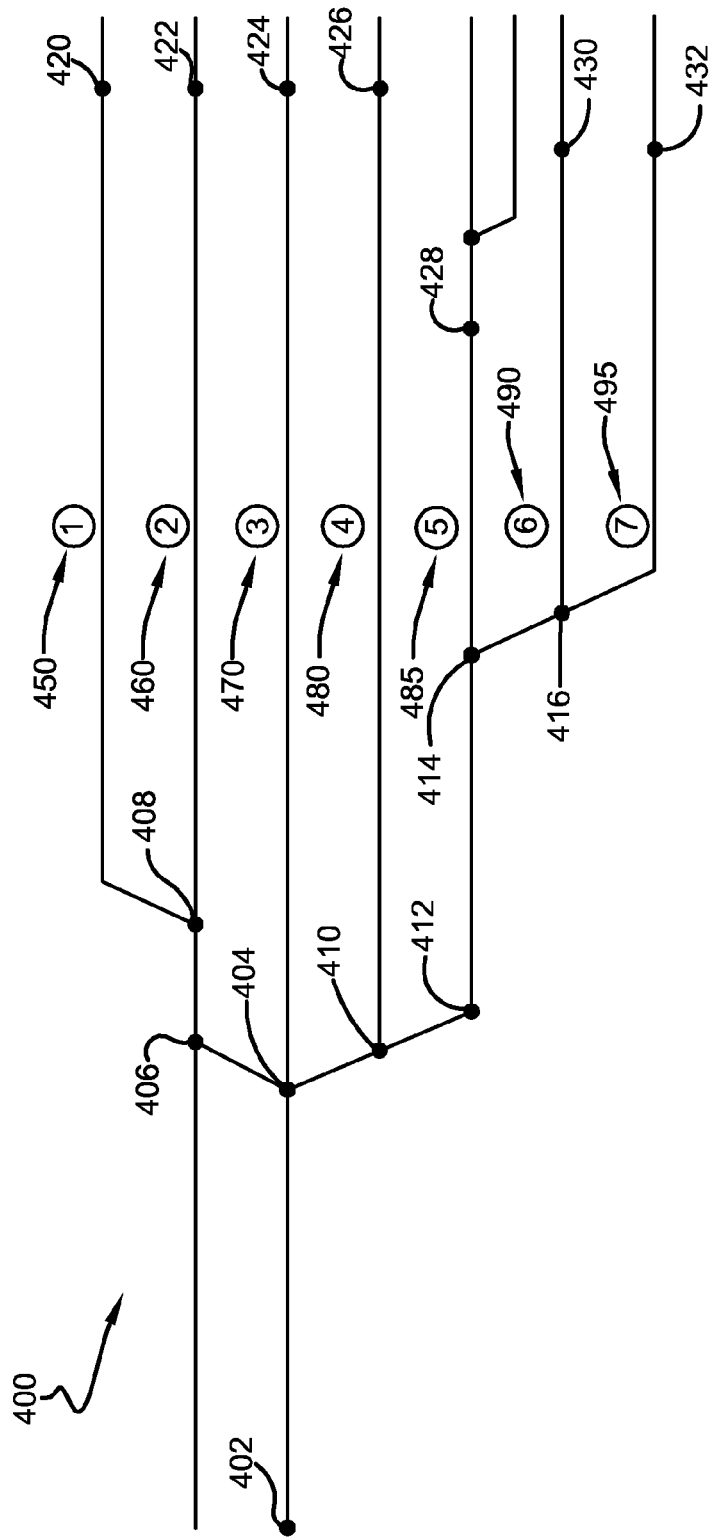
FIG. 4 illustrates an embodiment of a route chart used with a navigation system to manage route selection and activation for a vehicle.

FIG. 4 illustrates an embodiment of a route chart 400 used with a navigation system to manage route selection and activation for a vehicle. The route chart 400 can include a first route 450 from a start location 402 to an end location 420, a second route 460 from the start location to an end location 422, a third route 470 from the start location to an end location 424, a fourth route 480 from the start location to an end location 426, a fifth route 485 from the start location to an end location 428, a sixth route 490 from the start location to an end location 430, and a seventh route 495 from the start location to an end location 432. There can be a plurality of routes for a plurality of locations and the route chart of FIG. 4 is an example and is not to be limiting on the subject invention. Each route from the locations selected can include switches, wherein each switch includes a setting or configuration to activate a particular path of navigation or route. Each route can include a set of switches in which each switch includes a particular setting related thereto. For instance, the first route can include a switch 404, a switch 406, and a switch 408. The second route, for instance, can include the switch 404, the switch 406, and the switch 408. Although the first route and the second route can include a similar set of switches, the settings for each switch can differ (e.g., switch 408 is a first setting for the first route and switch 408 is a second setting for the second route). The third route, for example, can include the switch 404. The fourth route can include the switch 404 and a switch 410. The fifth route, for example, can include the switch 404, the switch 410, a switch 412, and a switch 414. The sixth route, for instance, can include the switch 404, the switch 410, the switch 412, the switch 414, and a switch 416. The seventh route, for example, can include the switch 404, the switch 410, the switch 412, the switch 414, and the switch 416. Each switch can include a setting or configuration for each specific route.

In an embodiment, the map route component can extend the route chart to include a graphical overlay or other extended graphical or window-like features. For instance, the display of the route chart can be extended to have a drop-down menu that displays routes existent from the start point/signal. In another example, the drop-down menu/list can pop-up on an input (e.g., right click from a mouse input) selection of a starting signal. For instance, a user can select one of the possible routes from the start point/signal from the drop-down list, which can highlight the selected route. Such graphical overlay or additional drop-down menu/list can be an additional or alternative manner of route selection apart from selecting a route by selecting the start and end points.

The previously described systems can create one or more indicia representative of settings of two or more switches for each route within a route chart, wherein a route is a path of navigation for a vehicle. Each route (e.g., first route, second route, third route, fourth route, fifth route, sixth route, and seventh route) includes an indicia (e.g., data structure, control word with defined bits, electronic indicia, among others) representative of the settings for each switch within the route that can be used to configure switches for a selected route of a vehicle.

The aforementioned systems, components (e.g., data aggregation component, build component, map route component, route charts, switch data, among others), and the like have been described with respect to interaction between several components and/or elements. Such devices and elements can include those elements or sub-elements specified therein, some of the specified elements or sub-elements, and/or additional elements. Further yet, one or more elements and/or sub-elements may be combined into a single component to provide aggregate functionality.

Figure 5:
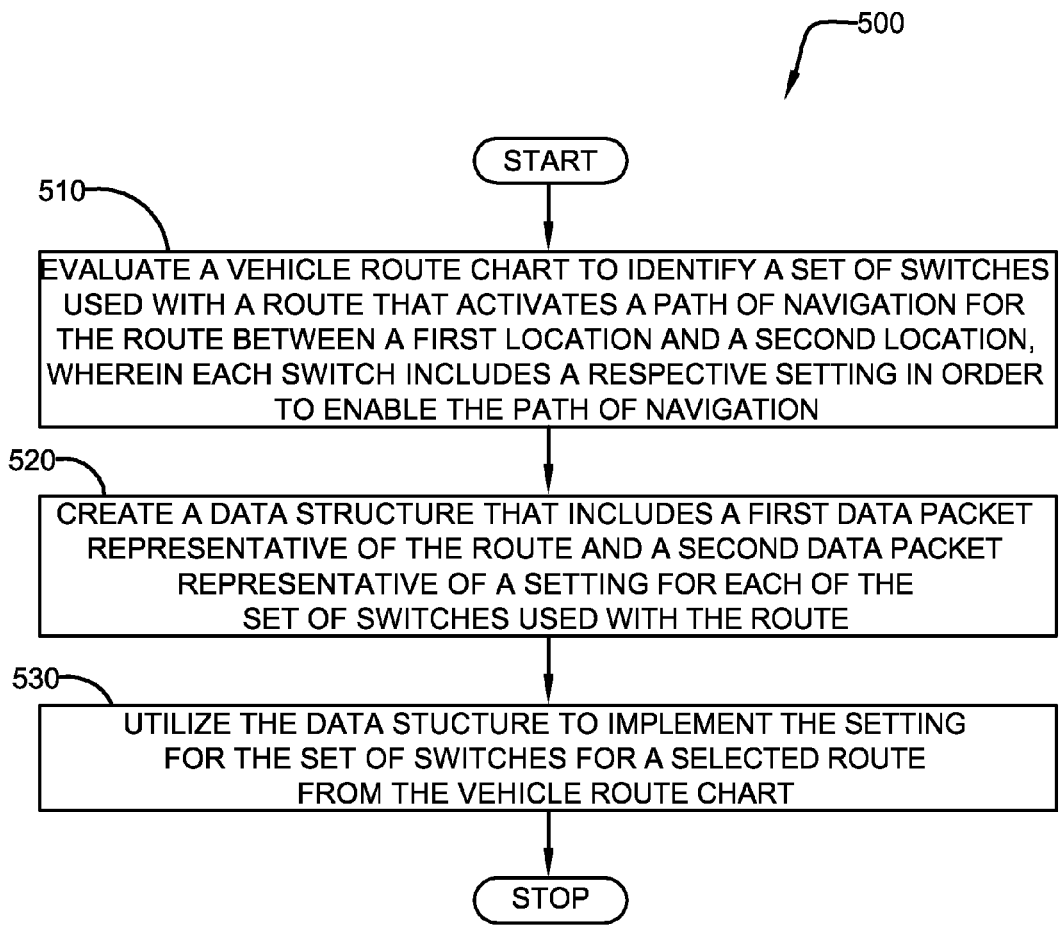
FIG. 5 illustrates a flow chart of an embodiment of a method for creating a data structure that includes indicia representative of two or more switch settings for a route within a route chart for multiple locations.
Figure 6:
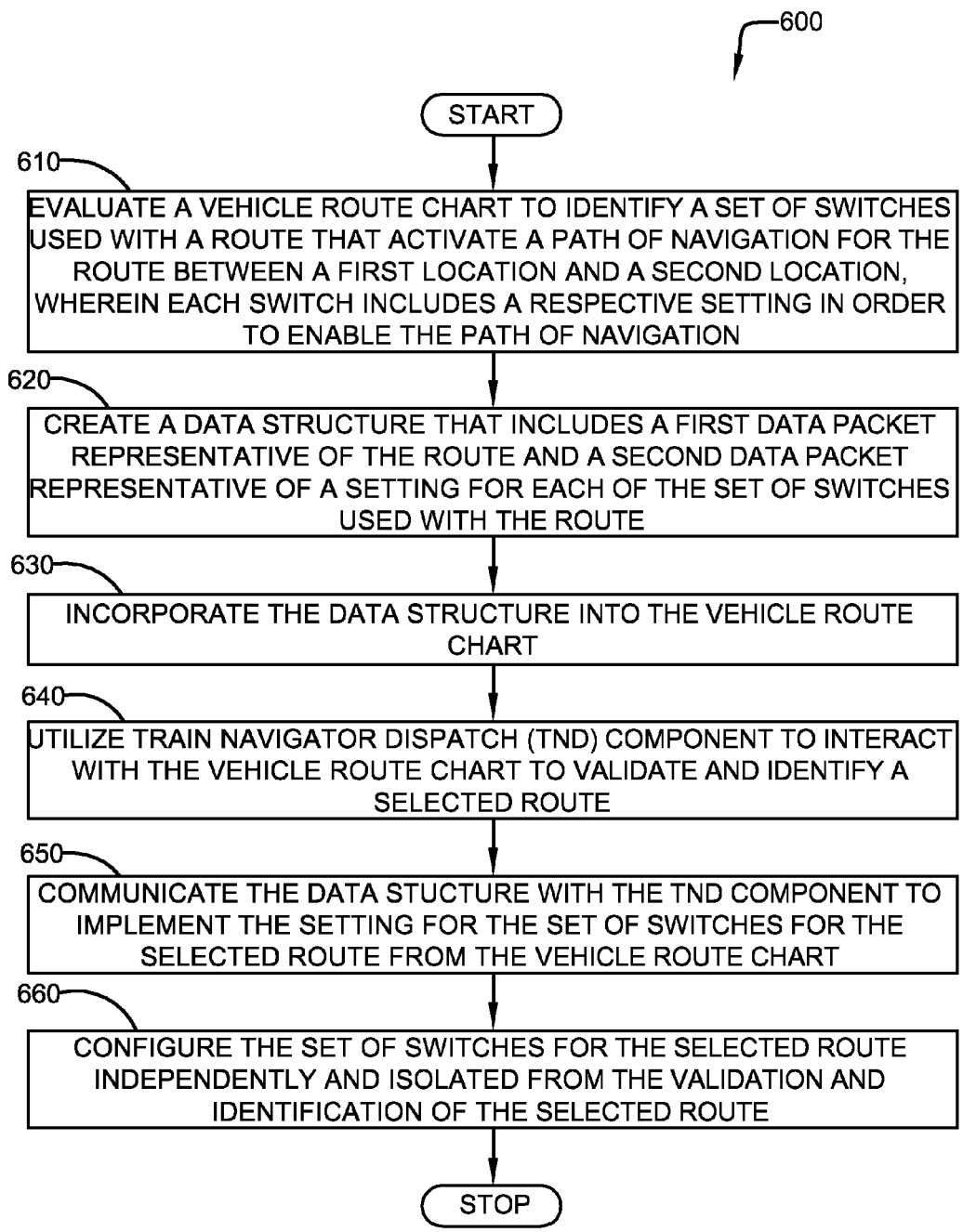
FIG. 6 illustrates a flow chart of an embodiment of a method for using a vehicle route chart while isolating route generation from switch configuration for each route.

Methodologies may be implemented with reference to the flow charts of FIGS. 5 and 6. While for purposes of simplicity of explanation, the methodologies are shown and described as a series of functional blocks, the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 5 illustrates a method 500 for creating a data structure that includes indicia representative of two or more switch settings for a route within a route chart for multiple locations. At reference numeral 510, a vehicle route chart can be evaluated to identify a set of switches used with a route (e.g., selected route) that activate a path of navigation for the route between a first location and a second location, wherein each switch includes a respective setting to enable the path of navigation. At reference numeral 520, a data structure can be created that includes a first data packet representative of the route and a second data packet representative of a respective one or more settings for each switch of the set of switches used with the route. At reference numeral 530, the data structure can be used to implement the settings for the set of switches for the selected route from the vehicle route chart. For example, the data structure may be communicated (e.g., as one or more signals) from a first location to one or more components at one or more second, remote locations for control of the switches based on the data structure.

FIG. 6 illustrates a method 600 for using a vehicle route chart with a vehicle dispatch component while isolating route generation from switch configuration for each route. At reference numeral 610, a vehicle route chart can be evaluated to identify set of switches used with a route (e.g., a selected route) that activate a path of navigation for the route between a first location and a second location, wherein each switch includes a respective setting to enable the path of navigation. At reference numeral 620, a data structure can be created that includes a first data packet representative of the route and a second data packet representative of a respective one or more settings for each switch of the set of switches used with the route. At reference numeral 630, the data structure can be incorporated into the vehicle route chart. For instance, the vehicle route chart can be modified to include the data structure. The data structure within the vehicle route chart can be isolated from route generation within the vehicle route chart. Isolation can refer to using a uniform data structure for settings/configurations for wayside equipment for a route that does not affect or otherwise change the vehicle route chart that includes available routes. For instance, packet separation between a data packet for the vehicle route chart and a data packet for one or more settings of a switch (e.g., or wayside equipment) provides a sandboxed approach in which information of route selection/generation and switch setting information are independent and isolated from one another.

At reference numeral 640, a vehicle dispatch component can be used to interact with the vehicle route chart to validate and identify a selected route. At reference numeral 650, the data structure can be transmitted and/or received to or by the vehicle dispatch component to implement the settings for the set of switches for the selected route from the vehicle route chart. At reference numeral 660, the set of switches for the selected route can be configured independently and isolated from the validation and identification of the selected route.

The method includes modifying the vehicle route chart to include the data structure, wherein the data structure included with the vehicle route chart is isolated from a route selection within the vehicle route chart. The method includes the data structure being a first data structure, and the method further comprises creating plural second data structures for plural additional routes between a plurality of third locations associated with the vehicle route chart. The method can further include creating a data structure for each route between two locations for a plurality of locations associated with the vehicle route chart. (For example, the method may comprise creating respective data structures for plural routes between plural locations associated with the vehicle route chart.) The method can further include selecting at least one of the route, the first location or the second location from the vehicle route chart. The method includes communicating a portion of the data structure. The method includes receiving a portion of the data structure. The method can further include identifying a corresponding data structure that includes the selected route, the selected first location, and the selected second location. The method can further include using the corresponding data structure to communicate and implement the settings for the set of switches to enable the path of navigation for the selected route between the selected first location and the selected second location. For instance, the set of switches can include at least two or more signal-switches that control respective junctions included with the path of navigation for the route. The method can further include communicating the data structure to at least one of a component associated with a CTC territory or a component associated with a TWC territory based on a geographic location(s) of at least one of the set of switches or the path of navigation for the route. The method includes displaying the settings for the switches for the selected route. The method can further include creating the data structure independently from validating the selected route from the vehicle route chart. The method can further include communicating a control signal to the set of switches based on the second data packet of the data structure. The method can further include using the first data packet of the data structure with a first system for route validation. The method can further include using the second data packet of the data structure with a second system for controlling the set of switches for the selected route. The method can further include displaying the setting for each switch for the selected route. The method can further include the second data packet that can indicate at least one of a left direction, a right direction, or a straight direction for each switch in the set of switches for the selected route.

In another embodiment, a method comprises evaluating a vehicle route chart to identify a set of switches that are operable to activate a path of navigation for a selected route between a first location and a second location. The switches include respective settings to enable the path of navigation. The method further comprises creating a data structure that includes a first data packet representative of the selected route and a second data packet representative of the respective settings for the switches. The method further comprises controlling the settings for the set of switches for the selected route based at least in part on the data structure from the vehicle route chart.

In another embodiment, a system comprises means for evaluating a vehicle route chart to identify a set of switches used with a route that activate a path of navigation for the route between a first location and a second location, wherein each switch of the set of switches includes a respective setting to enable the path of navigation, wherein the means can be a portion of hardware, a portion of software, or a combination thereof. The system may also comprise means for creating a data structure that includes a first data packet representative of the route and a second data packet representative of the respective setting for each switch of the set of switches used with the route, wherein the means can be a portion of hardware, a portion of software, or a combination thereof. The system may also comprise means for communicating the data structure to implement the respective setting for each switch of the set of switches for the route from the vehicle route chart, wherein the means can be a portion of hardware, a portion of software, or a combination thereof.

With reference to the drawings, like reference numerals designate identical or corresponding parts throughout the several views. However, the inclusion of like elements in different views does not mean a given embodiment necessarily includes such elements or that all embodiments of the invention include such elements.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A method, comprising:
    evaluating a vehicle route chart to identify a set of switches that are operable to activate a path of navigation for a selected route between a first location and a second location, wherein the switches include respective settings to enable the path of navigation;
    creating a data structure that includes a first data packet representative of the selected route and a second data packet representative of the respective settings for the switches;
    controlling the settings for the set of switches for the selected route based at least in part on the data structure from the vehicle route chart; and
    controlling settings for wayside signaling devices associated with the set of switches for the selected route based at least in part on the data structure from the vehicle route chart.

2. The method of claim 1, further comprising modifying the vehicle route chart to include the data structure, wherein the data structure included with the vehicle route chart is isolated from a route selection within the vehicle route chart.

3. The method of claim 2, further comprising communicating a signal to configure the settings for the set of switches, wherein the signal is based on the data structure.

4. The method of claim 1, wherein the data structure is a first data structure, and the method further comprises creating plural second data structures for plural additional routes between a plurality of third locations associated with the vehicle route chart.

5. The method of claim 1, further comprising selecting at least one of the selected route, the first location, or the second location from the vehicle route chart.

6. The method of claim 5, further comprising communicating a portion of the data structure.

7. The method of claim 6, further comprising receiving a portion of the data structure.

8. The method of claim 1, wherein the set of switches includes at least two signal-switches that control respective junctions included with the path of navigation for the selected route.

9. The method of claim 1, further comprising communicating the data structure to at least one of a centralized traffic control territory or a track warrant control territory based on a geographic location of at least one switch of the set of switches or the path of navigation for the selected route.

10. The method of claim 1, further comprising displaying the settings for the switches for the selected route.

11. The method of claim 1, further comprising communicating a control signal to the set of switches based on the second data packet of the data structure.

12. The method of claim 1, further comprising using the first data packet of the data structure with a first system for route validation.

13. The method of claim 12, further comprising using the second data packet of the data structure with a second system for controlling the set of switches for the selected route.

14. The method of claim 1, wherein the second data packet indicates at least one of a left direction, a right direction, or a straight direction for each switch in the set of switches for the selected route.

15. A system, comprising:
a vehicle route chart that includes a plurality of routes between a plurality of locations, and each route respectively includes a set of switches with respective settings that enable a path of navigation between a first location and a second location of the plurality of locations; and
a processor coupled to a memory, the processor configured to execute the following computer-executable components stored in the memory:
a data aggregation component that is configured to create a data structure for a selected route of the plurality of routes from the vehicle route chart, wherein the data structure includes a data packet with settings for the set of switches of the selected route;
a map route component that is configured to employ a portion of the data structure to adjust the settings of the set of switches of the selected route from the vehicle route chart; and
a vehicle dispatch component that is configured to communicate a signal to configure the settings for the set of switches, wherein the signal is based on the data structure, and configured to control settings for wayside signaling devices associated with the set of switches for the selected route based at least in part on the data structure.

16. The system of claim 15, wherein the vehicle dispatch component is configured to select at least one of the selected route, the first location, or the second location.

17. The system of claim 16, wherein the data aggregation component is configured to create the data structure independent and isolated from a validation of the selected route from the vehicle route chart.

18. The system of claim 15, further comprising a component configured to receive the signal.

19. A system, comprising:
means for evaluating a vehicle route chart to identify a set of switches used with a route that activate a path of navigation for the route between a first location and a second location, wherein each switch of the set of switches includes a respective setting to enable the path of navigation;
means for creating a data structure that includes a first data packet representative of the route and a second data packet representative of the respective setting for each switch of the set of switches used with the route;
means for communicating the data structure to implement the respective setting for each switch of the set of switches for the route from the vehicle route chart and for communicating the data structure to implement settings for wayside signaling devices associated with the set of switches for the route from the vehicle route chart.

* * * * *